(12) United States Patent
Song et al.

(10) Patent No.: US 7,150,944 B2
(45) Date of Patent: Dec. 19, 2006

(54) NON-AQUEOUS ELECTROLYTE COMPOSITIONS AND LITHIUM SECONDARY BATTERIES MADE THEREOF

(75) Inventors: Eui-Hwan Song, Cheonan-si (KR); Won-Il Jung, Cheonan-si (KR); Duck-Chul Hwang, Cheonan-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 10/278,354

(22) Filed: Oct. 22, 2002

(65) Prior Publication Data

US 2003/0152840 A1 Aug. 14, 2003

Related U.S. Application Data

(63) Continuation-in-part of application No. 09/565,158, filed on May 3, 2000, now abandoned.

(51) Int. Cl.
*H01M 10/08* (2006.01)
(52) U.S. Cl. .................. 429/324; 429/231.4; 429/338; 429/339
(58) Field of Classification Search .............. 429/189, 429/315, 324, 339
See application file for complete search history.

(56) References Cited

U.S. PATENT DOCUMENTS

| | | | |
|---|---|---|---|
| 5,538,812 A * | 7/1996 | Lee et al. .................... 429/307 |
| 5,731,106 A * | 3/1998 | Tsutsumi et al. ............ 429/332 |
| 5,759,714 A * | 6/1998 | Matsufuji et al. ........... 429/336 |
| 6,074,776 A * | 6/2000 | Mao .............................. 429/61 |
| 6,337,155 B1 * | 1/2002 | Takei et al. ................. 429/212 |
| 6,503,663 B1 * | 1/2003 | Song et al. ................. 429/331 |
| 6,511,769 B1 * | 1/2003 | Jung et al. .................... 429/62 |
| 6,521,375 B1 * | 2/2003 | Hwang et al. ............... 429/188 |
| 6,613,480 B1 * | 9/2003 | Hwang et al. .............. 429/332 |
| 2003/0152840 A1 * | 8/2003 | Song et al. ................. 429/338 |

FOREIGN PATENT DOCUMENTS

| | | | |
|---|---|---|---|
| EP | 759641 | * | 7/1996 |
| EP | 776058 | * | 5/1997 |
| EP | 878861 | * | 11/1998 |
| JP | 61-161673 | * | 7/1986 |
| JP | 07-220757 | * | 8/1995 |
| JP | 07-320778 | * | 12/1995 |
| JP | 10-189008 | * | 7/1998 |
| JP | 2000-090970 | * | 3/2000 |

OTHER PUBLICATIONS

Linden, D. "Handbok of Batteries," 2nd Ed., 1995, McGraw-Hill, 36.1-36.9.*

* cited by examiner

*Primary Examiner*—Mark Ruthkosky
(74) *Attorney, Agent, or Firm*—Blakely Sokoloff Taylor & Zafman

(57) ABSTRACT

Disclosed are non-aqueous electrolyte compositions of the present invention that comprise non-aqueous solvents and monomers such as aniline, phenanthrene, ethylenedioxythiophene, benzothiophene or derivatives thereof. The monomers are contained in the electrolytes of the present invention in the amounts of less than about 5.0 weight percent of the non-aqueous solvent. In the present invention, cyclic carbonates, linear carbonates or mixtures thereof can be used as the non-aqueous solvents. The electrolyte compositions of the present invention improve the safety characteristics of the cell by preventing the flow of large currents resulting from overcharge or feed-through, and also improve cell life characteristic by helping the reversible transfer of lithium ions.

16 Claims, No Drawings

NON-AQUEOUS ELECTROLYTE COMPOSITIONS AND LITHIUM SECONDARY BATTERIES MADE THEREOF

CROSS REFERENCE TO RELATED APPLICATION

This application is a continuation-in-part application of U.S. patent application Ser. No. 09/565,158, filed on May 3, 2000, now abandoned which is incorporated by reference herein in its entirety.

BACKGROUND OF THE INVENTION (a) Field of the Invention

The present invention relates to electrolyte compositions and lithium secondary batteries thereof, more particularly to electrolyte compositions containing monomers of conductive polymers which are capable of forming conductive polymer film on a surface of a positive electrode, and lithium secondary batteries thereof.

(b) Description of the Related Art

With the recent proliferation in the use of portable electronic devices, coupled with advancements made enabling increasingly smaller sizes and weights for these devices, research is being actively pursued to improve the energy density capabilities of lithium secondary batteries. These portable electronic machines have made it necessary to develop lithium secondary batteries with high energy density.

In the past, although lithium metal was used as the anode active material in lithium secondary batteries, a serious problem of dendritic formation on the surface of the lithium metal resulted during charging and discharging. This may cause short circuits, or more seriously, it could lead to the explosion of the battery. To prevent such problems, carbonaceous material is now widely used for the negative active material.

For cathode active materials in secondary batteries, metal chalcogenide compounds, enabling insertion and separation of lithium ions, are generally used, i.e. composite metal oxides such as $LiMn_2O_4$, $LiMnO_2$, $LiCoO_2$, $LiNiO_2$, and $LiNi_{1-x}Co_xO_2$ ($0<x<1$). The Mn-based active materials, $LiMn_2O_4$, and $LiMnO_2$, can be easily synthesized, are less expensive than the other materials, and have minimal negative affects on the environment. However, the capacities of these materials are low. In particular, $LiMn_2O_4$ has a relatively low discharge capacity as compared to other lithiated transition metal oxides such as $LiCoO_2$ and $LiNiO_2$. Furthermore, when cycled at high rates of charge and discharge operations, the discharge capacity is excessively reduced. Additionally, when the charge and discharge operations are continuously performed at high temperatures, manganese ions readily elute into the electrolyte from the surface of $LiMn_2O_4$. These manganese ions seriously deteriorate the cycle life characteristics of the battery. $LiCoO_2$ has been commercialized by Sony Energy Tec. as it exhibits an electrical conductivity at room temperature, provides a high level of battery voltage, and has exceptional electrode characteristics, even though it is unsafe when charging or discharging at high rates, and is more costly than the other materials. $LiNiO_2$ has a high discharge and charge capacity and is the least expensive of the above active materials for positive electrodes, but is not easily synthesized.

In addition, the choice of suitable electrolytes is one of the factors for improving cell characteristics because reactions of electrodes and electrolyte have an effect on cell performance. The electrolyte systems have previously only played a role of transfer of lithium ions. These electrolytes can not prevent the large amount of current resulting from overcharge or feed-through which can cause heat explosions. Recently, use of additives capable of forming a solid electrolyte interface (SEI) on a surface of negative electrode has become known. However, electrolyte that prevents a large current by forming a conductive polymer film on a surface of a positive electrode has not been disclosed.

SUMMARY OF THE INVENTION

It is an object of the present invention to provide a non-aqueous electrolyte containing monomers of conductive polymers which are capable of forming a conductive polymer film on a surface of a positive electrode for lithium secondary batteries with advanced safety features.

It is another object of the present invention to provide lithium secondary batteries with good safety and cycle life characteristic.

These and other objects may be achieved by a non-aqueous electrolyte for lithium secondary batteries including monomers of conductive polymers which can be polymerized electrochemically at a voltage of approximate 4V.

DETAILED DESCRIPTION OF THE INVENTION

Korean Patent Application No. 99-15926, filed on May 3, 1999, and entitled: "NON-AQUEOUS ELECTROLYTE COMPOSITIONS AND LITHIUM SECONDARY BATTERIES MADE THEREOF," is incorporated by reference herein in its entirety.

A more complete appreciation of the invention, and many of the attendant advantages thereof, will be readily apparent as the same becomes better understood by reference to the following detailed description.

One embodiment of the present invention provides non-aqueous electrolyte compositions comprising a non-aqueous carbonate-based solvent, preferably a non-aqueous halogen-free carbonate-based solvent; and a monomer of conductive polymer which can be polymerized electrochemically at a voltage of approximate 4V.

Another embodiment of the present invention provides non-aqueous electrolyte compositions comprising a non-aqueous carbonate-based solvent; and a monomer selected from the group consisting of phenanthrene, ethylenedioxythiophene, benzothiophene, and derivatives thereof.

The monomers above enhance the safety characteristics of the battery without deteriorating electrochemical properties thereof. The monomers such as phenanthrene, ethylenedioxythiophene, benzothiophene, and derivatives thereof inhibit decomposition of carbonate-based solvent resulting in a decrease of gas generation inside the battery at an elevated temperature.

The non-aqueous electrolyte compositions are prepared by adding monomers to non-aqueous carbonate-based solvents. The monomers are exemplified by aniline or derivatives thereof. The monomers are contained in the electrolytes of the present invention in amounts of less than about 5.0 weight percent, and preferably less than about 2.0 weight percent of the non-aqueous carbonate-based solvent. When the monomers are added in an amount of excess of 5.0 weight percent, the discharge capacity and non-reversible capacity increase thereby decreasing cell performance.

In the present invention, cyclic carbonates, linear carbonates, or mixtures thereof can be used as the non-aqueous carbonate-based solvents. Preferable examples are ethylene carbonate (EC), propylene carbonate (PC), diethyl carbonate (DEC), dimethyl carbonate (DMC), ethyl methyl carbonate (EMC), and dipropyl carbonate (DPC).

The electrolyte composition can include supporting salts such as lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), or mixtures thereof.

A lithium secondary battery contains a positive electrode, a negative electrode, and an electrolyte. The positive electrode includes a graphitic carbonaceous material as an anode active material, capable of inserting and separating lithium ions. The carbonaceous material has approximately 3.35~3.38 Å of $d_{002}$ interplanar distance, a crystalline size (Lc) of approximately 20 μm measured by X-ray diffraction, and an exothermic peak at temperature of 700° C. The carbonaceous material is prepared by a method comprising either carbonizing and graphitizing mesophase granular particles, or carbonizing and graphitizing mesophase pitch fibers. Also, either man-made or natural graphite can be used. The negative electrode includes lithium composite oxides as a cathode active material, capable of inserting and separating lithium ions. $LiCoO_2$, $LiNiO_2$, $LiNi_{1-x-y}Co_xM_yO_2$ (where, $0 \leq x \leq 1$, $0 \leq y \leq 1$, $0 \leq x+y \leq 1$, and M is selected from the group consisting of Al, Sr, Mg, and La), $LiMn_2O_4$, $LiMnO_2$, and the like can be used.

The electrolyte compositions of the present invention containing the monomers of conductive polymers are applied to lithium secondary batteries including the positive electrode and the negative electrode.

The following examples further illustrate the present invention.

EXAMPLES 1~4

Electrolyte compositions were prepared with various amounts of aniline as a monomer of a conductive polymer in a mixed non-aqueous organic solvent comprising a 3:3:1 volume ratio of ethylene carbonate (EC), ethyl methyl carbonate (EMC), and diethyl carbonate (DEC). The electrolyte compositions were injected into cylindrical cases that included electrode assemblies comprising positive electrodes and negative electrodes, and thereby 18650 cylindrical lithium secondary cells of Example 1~4 were fabricated. The positive electrodes comprised $LiNi_{1-x-y}Co_xSr_yO_2$ (where, $0 \leq x \leq 1$, $0 \leq y \leq 1$, $0 \leq x+y \leq 1$) and the negative electrodes comprised graphite material (KMFC: a product of Kawasaki Steel Inc.).

EXAMPLES 5~7

Electrolyte compositions were prepared with phenanthrene, ethylenedioxythiophene, and benzothiophene in a mixed non-aqueous organic solvent comprising a 3:3:1 volume ratio of ethylene carbonate (EC), ethyl methyl carbonate (EMC), and diethyl carbonate (DEC). The amount of the monomers was 2 wt. % of a mixed non-aqueous organic solvent. The electrolyte compositions were injected into prismatic cases that included electrode assemblies comprising positive electrodes and negative electrodes, and thereby prismatic-shaped lithium secondary cells of Example 5~7 were fabricated. The positive electrodes comprised $LiNi_{1-x-y}Co_xSr_yO_2$ (where $0 \leq x \leq 1$, $0 \leq y \leq 1$, $0 \leq x+y \leq 1$), and the negative electrodes comprised graphite material (KMFC: a product of Kawasaki Steel Inc.).

COMPARATIVE EXAMPLE 1

The electrolyte composition preparation procedure was performed in the same way as in Examples 1~4 with the exception that a monomer was not added. A cylindrical lithium secondary cell was fabricated with the resulting electrolyte in combination with the other components as described for Examples 1~4.

COMPARATIVE EXAMPLE 2

The electrolyte composition preparation procedure was performed in the same way as in Examples 5~7 with the exception that a monomer was not added. A prismatic-shaped lithium secondary cell was fabricated with the resulting electrolyte in combination with the other components as described for Examples 5~7.

For the electrolyte compositions of Examples 1~4 and Comparative Example 1, decomposition initiating potentials were measured and are shown in Table 1.

TABLE 1

|  | Example 1 | Example 2 | Example 3 | Example 4 | Comp. Example 1 |
|---|---|---|---|---|---|
| decomposition initiating potential (Li/Li+) | 5.3 V | 5.7 V | 6.0 V | 6.1 V | 4.8 V |

As illustrated in Table 1, the decomposition initiating potential of the electrolyte compositions according to Examples 1~4 have higher than that of Comparative Example 1. These results indicate that the aniline-containing electrolyte improves safety characteristics of the battery cells.

The cells fabricated according to Examples 1~4 and Comparative Example 1 were charged and discharged at rate of 1 C. Table 2 shows the cycle life characteristics of the cells after 100 charging and discharging cycles, initial discharge capacity, and safety characteristics of the cells.

TABLE 2

|  |  | Content of aniline (wt. %) | Cycle life (%) | Initial discharge capacity (mAh/g) | Safety level* | |
|---|---|---|---|---|---|---|
|  |  |  |  |  | 1 C Overcharge | Feed-Through |
| Examples | 1 | 0.1 | 96 | 144 | L0 | L1 |
|  | 2 | 0.2 | 97 | 140 | L0 | L1 |
|  | 3 | 0.4 | 95 | 141 | L0 | L1 |
|  | 4 | 1.0 | 95 | 139 | L0 | L1 |
| Comp. Example 1 |  | — | 98 | 143 | L3 | L5 |

Note)
*L0: Good, L1: Leakage, L2: Sparks or Flame, L3: Smoke, L4: Ignition, L5: Breakage In Table 2 above, the cells fabricated according to Examples 1~4 have good safety characteristics as well as good cycle life properties. On the contrary, the cell of Comparative Example 1 is inferior in its safety characteristics.

The cells fabricated according to Examples 5~7 were charged and discharged at a rate of 1 C. Table 3 shows the cycle life characteristics of the cells after 100 charging and discharging cycles, and safety characteristics of the cells.

TABLE 3

|  | Cycle life (%) | Safety level* 1 C Overcharge | Feed-Through |
| --- | --- | --- | --- |
| Example 5 | 93 | L0 | L1 |
| Example 6 | 91 | L0 | L1 |
| Example 7 | 87 | L0 | L1 |

Note)
*L0: Good,
L1: Leakage

In Table 3 above, the cells fabricated according to Examples 5~7 have good safety characteristics as well as good cycle life properties.

Table 4 below represents safety test results of the cell of Example 2 under various conditions.

TABLE 4

| | Leakage (L1) | Sparks (L2) | Flame (L2) | Smoke (L3) | Ignition (L4) | Breakage (L5) | Safety Level* |
| --- | --- | --- | --- | --- | --- | --- | --- |
| 1 C Overcharge | x | x | x | x | x | x | L0 |
| | x | x | x | x | x | x | L0 |
| | x | x | x | x | x | x | L0 |
| | x | x | x | x | x | x | L0 |
| | x | x | x | x | x | x | L0 |
| 3 C Overcharge | x | x | x | x | x | x | L0 |
| | o | x | x | x | x | x | L1 |
| | x | x | x | x | x | x | L0 |
| | o | x | x | x | x | x | L1 |
| | x | x | x | x | x | x | L0 |
| Feed-Through | o | x | x | x | x | x | L1 |
| | o | x | x | x | x | x | L1 |
| | o | x | x | x | x | x | L1 |
| | o | x | x | x | x | x | L1 |
| | o | x | x | x | x | x | L1 |
| Overcharge And Feed-Through | o | x | x | x | x | x | L1 |
| | o | x | x | x | x | x | L1 |
| | o | x | x | x | x | x | L1 |
| | o | x | x | x | x | x | L1 |
| Vertical Compression | o | x | x | x | x | x | L1 |
| | o | x | x | x | x | x | L1 |
| | o | x | x | x | x | x | L1 |
| | o | x | x | x | x | x | L1 |
| Horizontal Compression | o | x | x | x | x | x | L1 |
| | o | x | x | x | x | x | L1 |
| | o | x | x | x | x | x | L1 |
| | o | x | x | x | x | x | L1 |

Note)
*Safety level: L0: Good, L1: Leakage
o: occurring
x: not-occurring

As described above in Table 4, the electrolyte compositions of the present invention enhance the safety characteristics of the cells by adding monomers of conductive polymers which can be polymerized electrochemically at a voltage of approximate 4V and form conductive polymer films on a surface of positive electrode. The films have nothing to do with the transfer of lithium ions during normal charging and discharging. However, the films have a non-conducting property in that they lose conductivity at a high voltage of more than 4.3V, and thereby prevent flow of large currents resulting from overcharge or feed-through. The films also improve cell life characteristics by helping the reversible transfer of lithium ions.

The cells according to Examples 5~7 and Comparative Example 2 were charged at 0.2 C to a cut-off voltage of 4.2V under the condition of constant current and constant voltage (CC-CV), and discharged at 0.2 C to a cut-off voltage of 2.5V. Then the cells were charged at 0.5 C to a cut-off voltage of 4.2V under a CC-CV condition, and were then placed in a high temperature oven (90° C.) for 4 hours. The thicknesses of the cells before and after high temperature storage were measured using a micrometer. An increase rate of cell thickness was calculated from the following formula:

Increase rate (%)=(cell thickness after high temperature storage−cell thickness before high temperature storage)/cell thickness before high temperature storage. The results are represented in Table 6.

TABLE 6

|  | Example 5 | Example 6 | Example 7 | Comp. Example 2 |
| --- | --- | --- | --- | --- |
| Thickness increase rate (%) | 79 | 52 | 68 | 120 |

As shown in Table 6, the increases in thickness of the cells of Examples 5~7 were substantially less than that of the cell of Comparative Example 2. These results indicate that the monomers added in the electrolytic composition of Examples 5~7 prevent decomposition of non-aqueous solvent resulting in a decrease of gas generation inside the cells.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A lithium secondary battery comprising:
   a non-aqueous halogen-free carbonate-based solvent selected from the group consisting of ethylene carbonate, diethyl carbonate, and ethyl methyl carbonate;
   a monomer of conductive polymer which can be polymerized electrochemically at a voltage of approximately 4V, wherein the monomer is aniline; and
   wherein said lithium battery includes an anode and a cathode wherein the anode comprises a resin binder and graphite carbonaceous material wherein the carbonaceous material has approximately 3.35~3.38 Å of $d_{002}$ interplanar distance, crystalline size (Lc) of at least 20 nm measured by X-ray diffraction and the cathode comprises lithium composite oxides.

2. The lithium secondary battery of claim 1 wherein the monomer is an additive and is contained in the amount of less than 5.0 weight percent of the non-aqueous solvent.

3. The lithium secondary battery of claim 2 wherein the monomer is an additive and is contained in the amounts of less than 2.0 weight percent of the non-aqueous solvent.

4. The lithium secondary battery of claim 1 wherein the composition comprises supporting salts selected from the group consisting of lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), and mixtures thereof.

5. The lithium secondary battery of claim 1, further comprising;

an anode comprising resin binder and graphitic carbonaceous material capable of insertion and separation of lithium ions as an anode active material; and a cathode comprising lithium composite oxides capable of insertion and separation of lithium ions as a cathode active material.

6. The lithium secondary battery of claim 5 wherein the carbonaceous material has approximately 3.35~3.38 Å of $d_{002}$ interplanar distance, crystalline size (Lc) of at least 20 nm measured by X-ray diffraction.

7. The lithium secondary battery of claim 5 wherein the carbonaceous material is prepared by a method comprising carbonizing and graphitizing mesophase granular particles.

8. The lithium secondary battery of claim 5 wherein the carbonaceous material is prepared by a method comprising carbonizing and graphitizing mesophase pitch fibers.

9. A lithium secondary battery comprising:
a non-aqueous halogen-free carbonate-based solvent selected from the group consisting of ethylene carbonate, diethyl carbonate, and ethyl methyl carbonate;
a monomer of conductive polymer which can be polymerized electrochemically at a voltage of approximately 4V and selected from the group consisting of aniline, phenanthrene, ethylenedioxythiophene, and benzothiophene; and
wherein said lithium battery includes an anode and a cathode wherein the anode comprises a resin binder and graphite carbonaceous material wherein the carbonaceous material has approximately 3.35~3.38 Å of $d_{002}$ interplanar distance, crystalline size (Lc) of at least 20 nm measured by X-ray diffraction and the cathode comprises lithium composite oxides.

10. The lithium secondary battery of claim 9 wherein the monomer is an additive and is contained in an amount of less than 5.0 weight percent of the non-aqueous solvent.

11. The lithium secondary battery of claim 10 wherein the monomer is an additive and is contained in an amount of less than 2.0 weight percent of the non-aqueous solvent.

12. The lithium secondary battery of claim 9 wherein the composition comprises supporting salts selected from the group consisting of lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), and mixtures thereof.

13. The lithium secondary battery of claim 9, further comprising;
an anode comprising resin binder and graphitic carbonaceous material capable of insertion and separation of lithium ions as an anode active material; and
a cathode comprising lithium composite oxides capable of insertion and separation of lithium ions as a cathode active material.

14. The lithium secondary battery of claim 13 wherein the carbonaceous material has approximately 3.35~3.38 Å of $d_{002}$ interplanar distance, and a crystalline size (Lc) of at least 20 nm measured by X-ray diffraction.

15. The lithium secondary battery of claim 13 wherein the carbonaceous material is prepared by a method of comprising carbonizing and graphitizing mesophase granular particles.

16. The lithium secondary battery of claim 13 wherein the carbonaceous material is prepared by a method of comprising carbonizing and graphitizing mesophase pitch fibers.

* * * * *